May 26, 1925.

E. J. ALFIERES 1,539,533

VAULT LIGHT LENS FRAME AND HOLDER

Filed Nov. 7, 1924

Emanuel J. Alfieres,

By Edwin Guthrie,

Attorney

Patented May 26, 1925.

1,539,533

UNITED STATES PATENT OFFICE.

EMANUEL J. ALFIERES, OF NEW YORK, N. Y.

VAULT-LIGHT LENS FRAME AND HOLDER.

Application filed November 7, 1924. Serial No. 748,368.

*To all whom it may concern:*

Be it known that I, EMANUEL J. ALFIERES, citizen of the United States, residing at New York, in the county of New York and State of New York, have invented certain new and useful Improvements in Vault-Light Lens Frames and Holders, of which the following is a specification.

This invention relates to vault light lens frames and holders for the frames, and is believed to be an improvement upon and in connection with the devices set forth in my application for Letters Patent of the United States for Forms for setting vault lights, filed July 18, 1924, Serial Number 726,806.

It is an object of this invention to simplify and to cheapen the manufacture of the frames and holders, and at the same time to provide means for setting the frames in the most expeditious manner calling for as little expert labor as practicable, and enabling the workman although of ordinary intelligence and capacity and not necessarily in possession of special training in this class of work, to reduce the time usually called for in accurately placing the frames and holding them for the application of the cement filling by which the frames are fixed in their final positions. To that end this invention consists essentially of parts of special construction and arrangement as hereinafter set forth and claimed.

Figure 1:
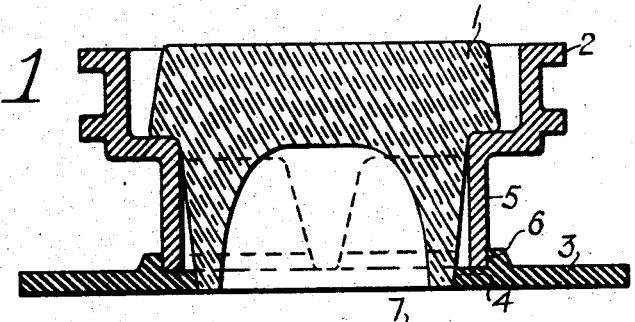
Figure 2:
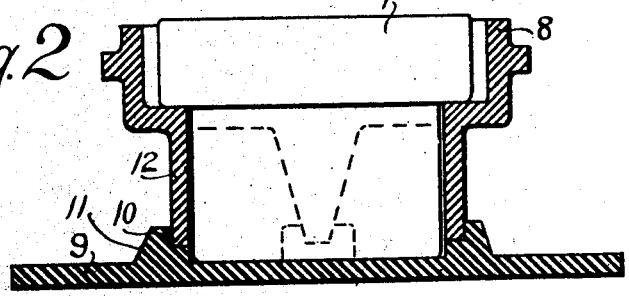
Figure 3:
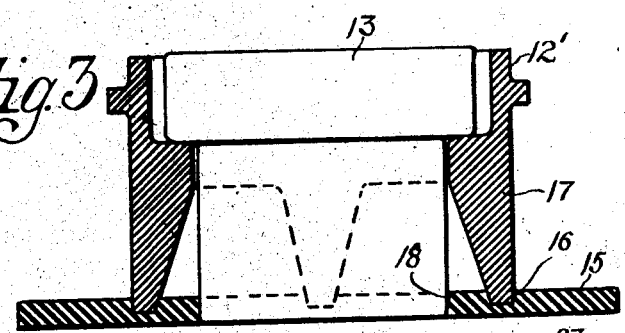
Figure 4:
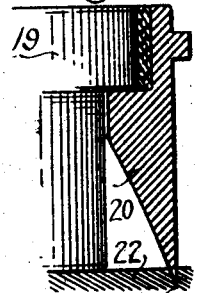
Figure 6:
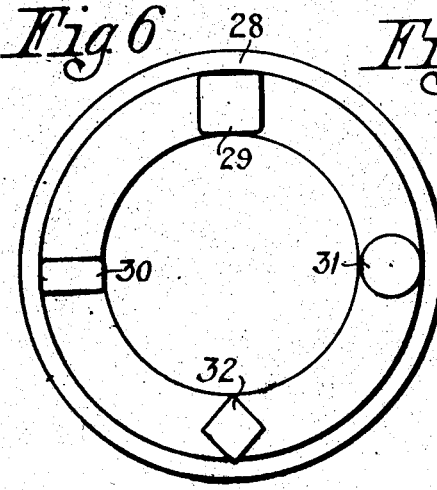
Figure 5:
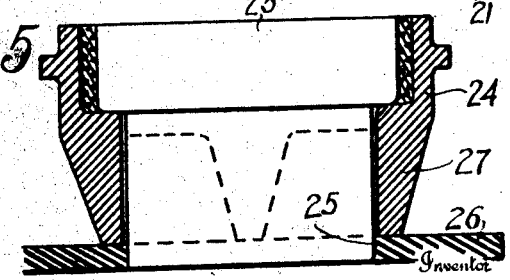

In the accompanying drawings forming a part of this application, Fig. 1 represents a vertical section of a lens frame and holder therefor constructed in accordance with this invention. Fig. 2 is a similar section showing a modified holder. Fig. 3 is a similar section showing a further modified frame and holder. Fig. 4 is a similar section showing a holder with relatively sharp ended legs having the general form of the legs shown in Fig. 3. Fig. 5 is a similar section showing another modification of the frame, and showing the lens fixed in the frame, the position of both lens and frame being fixed by the engagement of the lens with the holder or support. Fig. 6 is a bottom view of a frame having in general the body form of the frame shown in Fig. 3, but illustrating several shapes in which the legs of the frame may be fashioned within the purview of this invention.

Throughout the drawings and description the same number is used to refer to the same part.

Considering Fig. 1 of the drawings, the lens 1 is carried by the frame 2 which is provided with the customary internal seat for the lens comprising a shoulder of the frame as shown. The holder 3 is a mat of rubber, composition, or of any selected materials. It is removable and may be repeatedly used. The lower end of the lens fits the opening 4 in the holder. The lower ends of the legs 5 are received and held in an annular shoulder 6 formed upon the upper surface of the holder. It will be noted that, as indicated in broken lines, the legs 5 are wedged-shaped with the narrow ends down.

In Fig. 2, the lens 7 is seated in the frame 8 as before, but the holder 9 has the seating shoulder 10 formed in the raised block 11 formed integrally with the holder, and the legs 12 are received and engaged by the shoulders on the blocks 11. It will be understood that the seating shoulders 10 may be recesses formed in the tops of the integral blocks 11 on the upper surface of the holder 9.

It will be noted in Fig. 2 that the lens 7 does not pass through the holder 9, but rests upon the upper surface of the holder within the blocks which hold the frame 8.

In the modification illustrated in Fig. 3, the lens 13 is seated as before in the frame 12', but the holder 15 is now provided with spaced sockets or depressions 16 for the ends of the legs 17. Attention is called to the construction of the legs 17. They are wedge-shaped as before described, but it will be noted that the inner surface of the leg slants downwardly and outwardly. Therefore, when the cement filling is applied the lens will be held by the cement all around the lower portion of the lens, and the legs 17 will have holding cement all around them individually.

In the modification set forth in Fig. 4, the lens 19 does not pass through the holder, as does the lens 13 in Fig. 3 for the passage of which the opening 18 is provided, but the lens 19 in Fig. 4 rests upon the support 22. This support may be the usual boards or wooden platform upon which the frames are arranged preparatory to placing the lens and applying the cement, and the frame 20 may be quickly and firmly positioned by driving the relatively sharp end 21 of the leg into the board 22. The board is as usual removable after the cement has been applied.

In the modification illustrated in Fig. 5, the lens 23 is cemented in the frame 24, and the lower end of the lens passed through the opening 25 in the holder 26. Therefore, the engagement of the lens and the holder fixes the position of both lens and frame. The legs 27 are of slightly modified form in that their outer surfaces slant downwardly and inwardly. The intention is to cut out metal and weight where it is practicable to do so.

Fig. 6 is a bottom view of a frame on the order generally of the frame shown in Fig. 3. The frame in Fig. 6 is marked 28. This figure of the drawings is intended to illustrate various cross-sectional forms in which the legs of the frame may be fashioned. Leg 29 is square in section, leg 31 is rectangular and longer than it is wide, leg 31 is cylindrical, and leg 32 has a diamond cross-section.

The operation of all the modifications and of the first form described is the same. The removable holders engage the feet or lower ends of the legs of the frames, and a seat or opening is provided in each holder to receive the lower portion of the lens. The holders fit together as set out in my aforesaid application for patent, and it is not a matter of either great skill or experience in this line of work to place the frames with rapidity and properly.

Having now described this invention and explained the manner of its operation, what I claim is:—

1. A vault light lens frame and holder, comprising a frame having a body portion provided with an internal shoulder, the said body portion having downwardly extending spaced legs, and a removable holder mat for the frame having means constructed to engage the lower ends of the said legs.

2. A vault light lens frame and holder, comprising a frame having a body portion provided with an internal shoulder, the said body portion having downwardly extending legs, the said legs being wedge-shaped with the point downward, and means for engaging the lower ends of the legs and to support the frame.

3. A vault light lens frame and holder, comprising a frame having a body portion provided with internal means for supporting a lens, the said body portion having downwardly extending spaced legs, and removable means for engaging the lower ends of the said legs and for supporting the said frame.

4. A vault light lens frame and holder, comprising a frame having a body portion provided with an internal shoulder, the said body portion having downwardly extending spaced legs, and a removable holder mat for the frame having depressions constructed to receive and engage the lower ends of the said legs.

5. A vault light lens frame and holder, comprising a frame having a body portion provided with internal means for supporting a lens, the said body portion having downwardly spaced legs, a lens, and removable means for supporting the frame and for engaging the lower ends of the legs and the lens.

In testimony whereof I affix my signature.

EMANUEL J. ALFIERES.